US012639163B2

(12) United States Patent
Wang et al.

(10) Patent No.: US 12,639,163 B2
(45) Date of Patent: May 26, 2026

(54) READ THRESHOLD PREDICTION BASED ON WEIGHT-SHARING DEEP NEURAL NETWORKS IN NON-VOLATILE MEMORY DEVICES

(71) Applicant: SK hynix Inc., Icheon-si (KR)

(72) Inventors: Haobo Wang, San Jose, CA (US); Fan Zhang, Fremont, CA (US)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/829,649

(22) Filed: Sep. 10, 2024

(65) Prior Publication Data

US 2026/0072786 A1     Mar. 12, 2026

(51) Int. Cl.
*G06F 11/00* (2006.01)
*G06F 11/10* (2006.01)

(52) U.S. Cl.
CPC .... *G06F 11/1044* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 10,871,910 B1 * | 12/2020 | Alrod | G06F 12/0607 |
| 11,449,744 B2 * | 9/2022 | Chen | G06N 3/044 |
| 2017/0169332 A1 * | 6/2017 | Graves | G06N 3/044 |
| 2020/0107766 A1 | 4/2020 | Liu et al. | |
| 2020/0317458 A1 * | 10/2020 | Kanada | G06N 3/09 |
| 2022/0188366 A1 * | 6/2022 | Song | G06F 40/284 |
| 2023/0162803 A1 | 5/2023 | Zhang et al. | |
| 2023/0176765 A1 * | 6/2023 | Wang | G06F 3/0679 |

* cited by examiner

*Primary Examiner* — Mujtaba M Chaudry
(74) *Attorney, Agent, or Firm* — Perkins Coie LLP

(57) ABSTRACT

Devices, systems, and methods for improving the performance of a non-volatile memory are described. An example method includes extracting one or more parameters from each of multiple history reads of a page of the memory device, and processing, using each of multiple first neural networks, a corresponding history read of the multiple history reads to generate a corresponding intermediate vector of multiple intermediate vectors. Each of the multiple first neural networks are trained using measurements from one or more pages of another memory device, and each first neural network is activated upon determining that the one or more parameters for the corresponding history read have been extracted. The method further includes processing, using a second neural network, the multiple intermediate vectors to generate an updated read threshold set, and applying the updated read threshold set to the memory device to retrieve information from the memory device.

20 Claims, 9 Drawing Sheets

900

Extracting one or more parameters from each of a plurality of history reads of a page of the memory device — 910

Processing, using each of a plurality of first neural networks, a corresponding history read of the plurality of history reads to generate a corresponding intermediate vector of a plurality of intermediate vectors — 920

Processing, using a second neural network, the plurality of intermediate vectors to generate an updated read threshold set — 930

Applying the updated read threshold set to the memory device to retrieve information from the memory device — 940

Memory System

110

| 102 | 104 | 106 | 108 |
|---|---|---|---|
| Memory Area | Memory Area | Memory Area | Memory Area |
| Memory Unit (e.g., block, page) | Memory Unit (e.g., block, page) | Memory Unit (e.g., block, page) | Memory Unit (e.g., block, page) |
| Memory Unit | Memory Unit | Memory Unit | Memory Unit |
| ⋮ | ⋮ | ⋮ | ⋮ |
| Memory Unit | Memory Unit | Memory Unit | Memory Unit |

. . .

120

121

Memory Interface (e.g., NAND memory interface)

| 122 | 123 | 124 | 125 |
|---|---|---|---|
| System Memory | Buffer/Cache | Processor | ECC Engine |

126

Host Interface (e.g., SATA, PATA, SD, USB, PCLe)

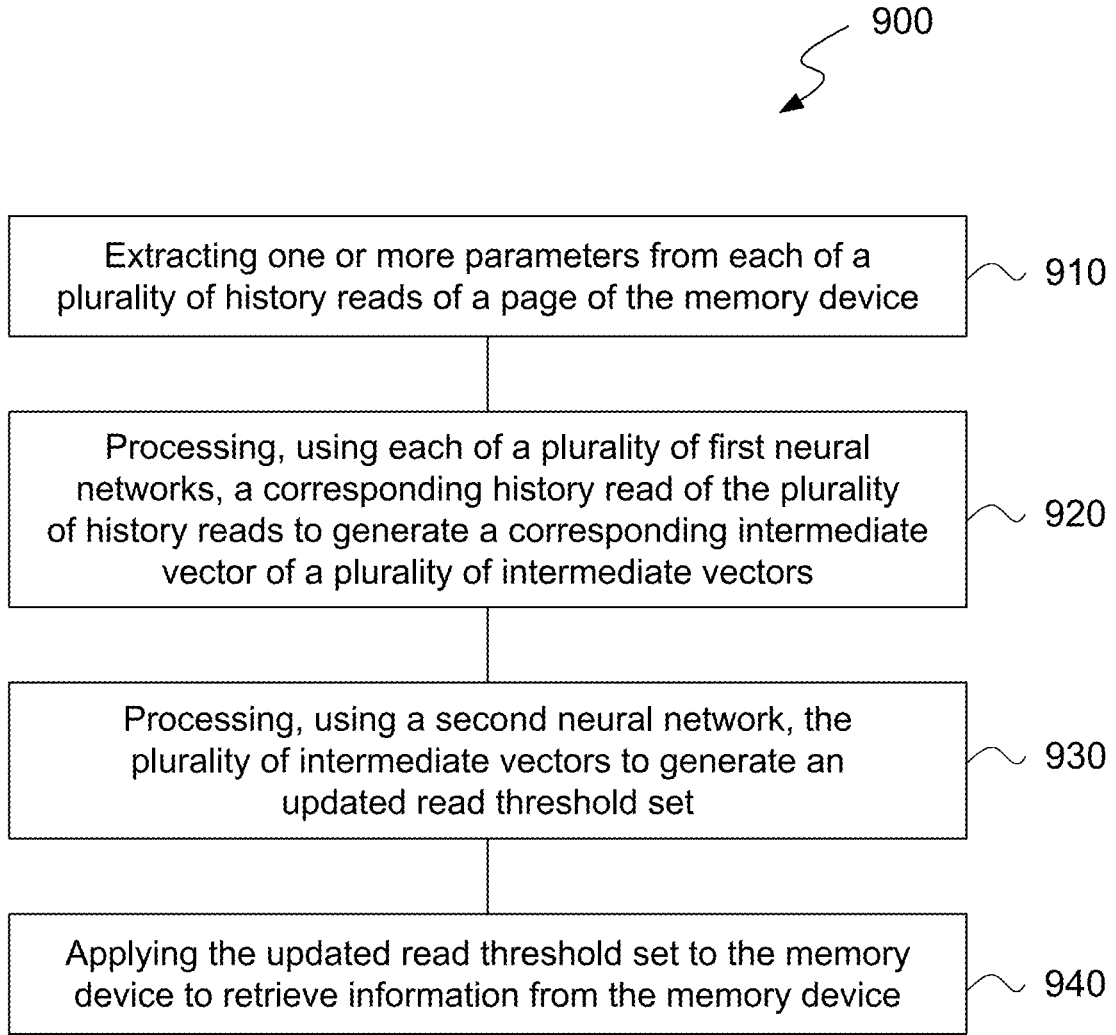

900

Extracting one or more parameters from each of a plurality of history reads of a page of the memory device — 910

Processing, using each of a plurality of first neural networks, a corresponding history read of the plurality of history reads to generate a corresponding intermediate vector of a plurality of intermediate vectors — 920

Processing, using a second neural network, the plurality of intermediate vectors to generate an updated read threshold set — 930

Applying the updated read threshold set to the memory device to retrieve information from the memory device — 940

READ THRESHOLD PREDICTION BASED ON WEIGHT-SHARING DEEP NEURAL NETWORKS IN NON-VOLATILE MEMORY DEVICES

TECHNICAL FIELD

This patent document generally relates to non-volatile memory devices, and more specifically, to non-volatile memory devices that employ low-density parity-check codes.

BACKGROUND

Data integrity is an important feature for any data storage device and data transmission. In solid state memory storage (e.g., NAND flash) devices, information is stored in a cell by different charge levels in a cell. During the write and read process, noise is introduced by program disturb and inter-cell interference charge leakage that causes the voltage level to drop over time, where the drop is proportional to the amount of charge stored as well as the number of program and erase (P/E) cycles a cell has experienced. Accounting for the voltage drop when determining the read voltage thresholds increases the longevity of memory devices.

SUMMARY

Embodiments of the disclosed technology relate to methods, systems, and devices that improve the performance of a memory device that uses a low-density parity check (LDPC) code. In an example, the performance of the memory device is improved by using a weight-sharing architecture of neural networks to estimate read threshold voltages based on history reads from a previous attempt to read the page, thereby providing an additional read attempt of a page with minimal latency. The improved decoder can output an optimized read voltage thresholds that account for the degradation of the memory cells, thereby enabling the robust retrieval of information from various types of memory devices over the entire lifespan.

In one example, a method for improving performance of a memory device is described. The method includes extracting one or more parameters from each of multiple history reads of a page of the memory device, and processing, using each of multiple first neural networks, a corresponding history read of the multiple history reads to generate a corresponding intermediate vector of multiple intermediate vectors. In this example, the memory device is accessed using a read threshold set, and the one or more parameters includes a checksum, a ones count, a zeros count, or an asymmetric ratio that is based on a number of zero-to-one bit errors and a number of one-to-zero bit errors. Each of the multiple first neural networks are trained using measurements from one or more pages of another memory device, and each first neural network is activated upon determining that the one or more parameters for the corresponding history read have been extracted. The method further includes processing, using a second neural network, the multiple intermediate vectors to generate an updated read threshold set, and finally, applying the updated read threshold set to the memory device to retrieve information from the memory device.

In another example, the methods may be embodied in the form of an apparatus that includes a processor and a memory coupled to the processor.

In yet another example, the methods may be embodied in the form of processor-executable instructions and stored on a computer-readable program medium.

The subject matter described in this patent document can be implemented in specific ways that provide one or more of the following features.

BRIEF DESCRIPTION OF THE DRAWINGS

FIG. 1 illustrates an example of a memory system.

FIG. 9 illustrates a flowchart of an example method for improving the performance of a memory device.

DETAILED DESCRIPTION

Figure 2:
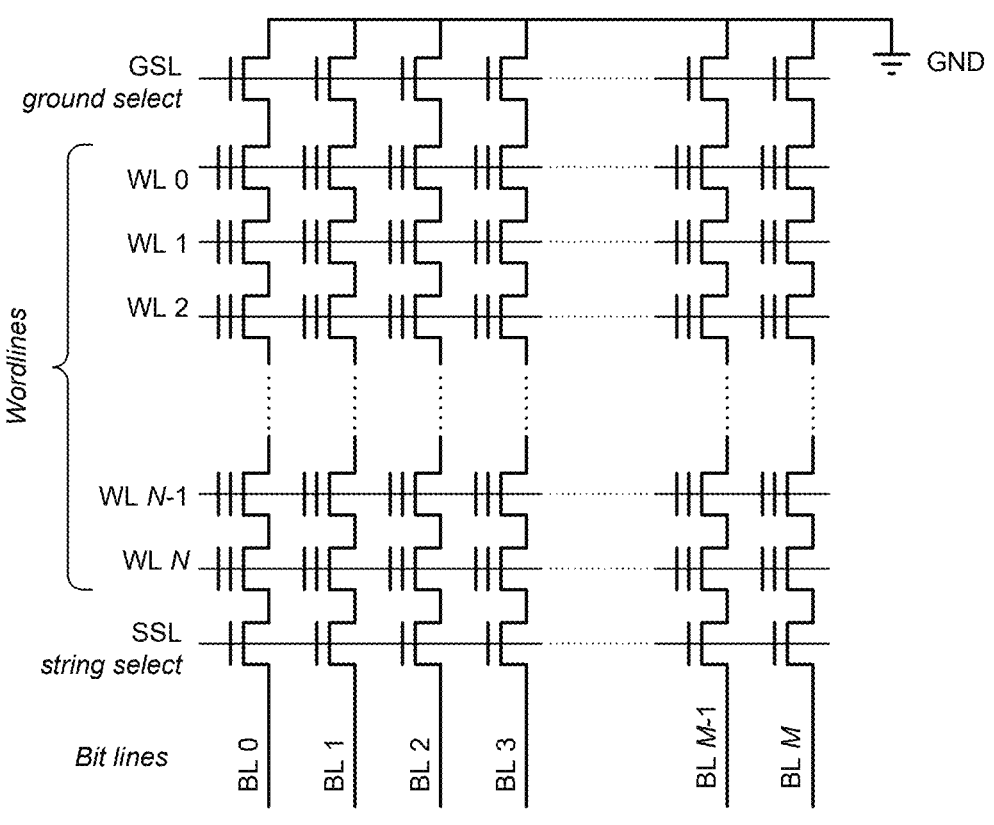
FIG. 2 is an illustration of an example non-volatile memory device.

Semiconductor memory devices may be volatile or non-volatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels, and distributions of read voltages for discriminating the data states must be adjusted over the lifetime of the memory device to have optimal values during read operations and/or read attempts.

FIGS. 1-6 overview a non-volatile memory system (e.g., a flash-based memory, NAND flash) in which embodiments of the disclosed technology may be implemented.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetore-sistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/in-structions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
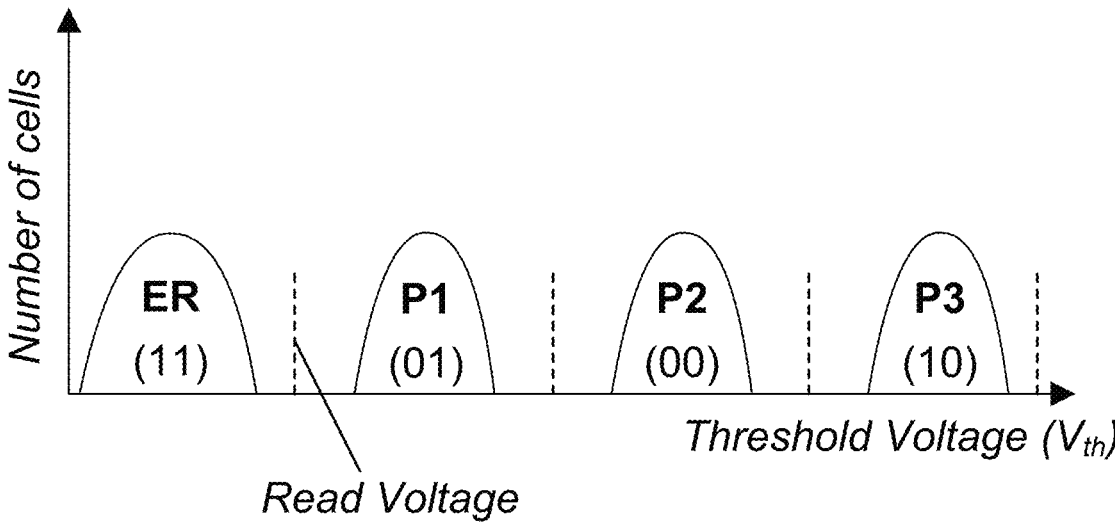
FIG. 3 is an example diagram illustrating the cell voltage level distribution $(V_{th})$ of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCO).

Figure 4:
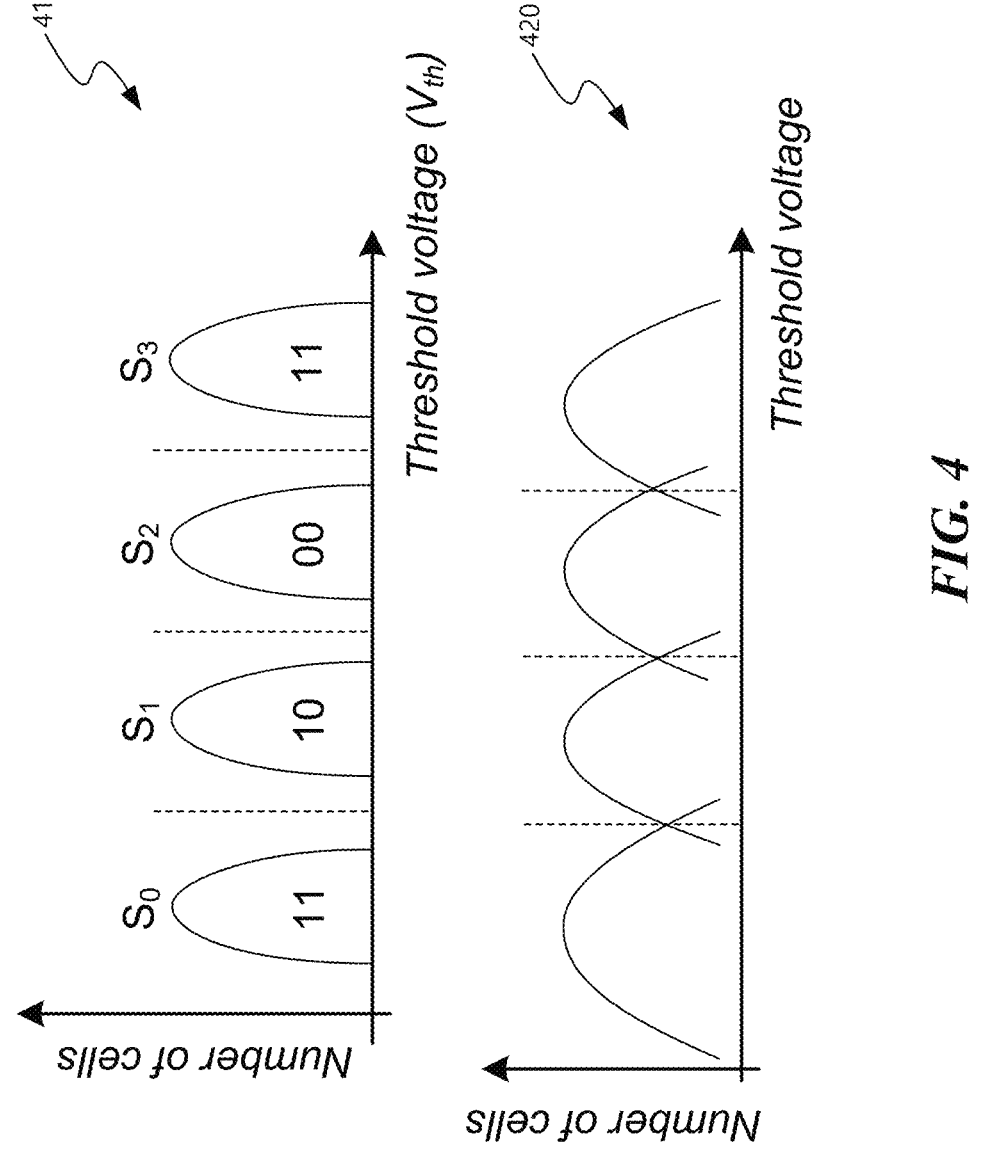
FIG. 4 is another example diagram illustrating the cell voltage level distribution $(V_{th})$ of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
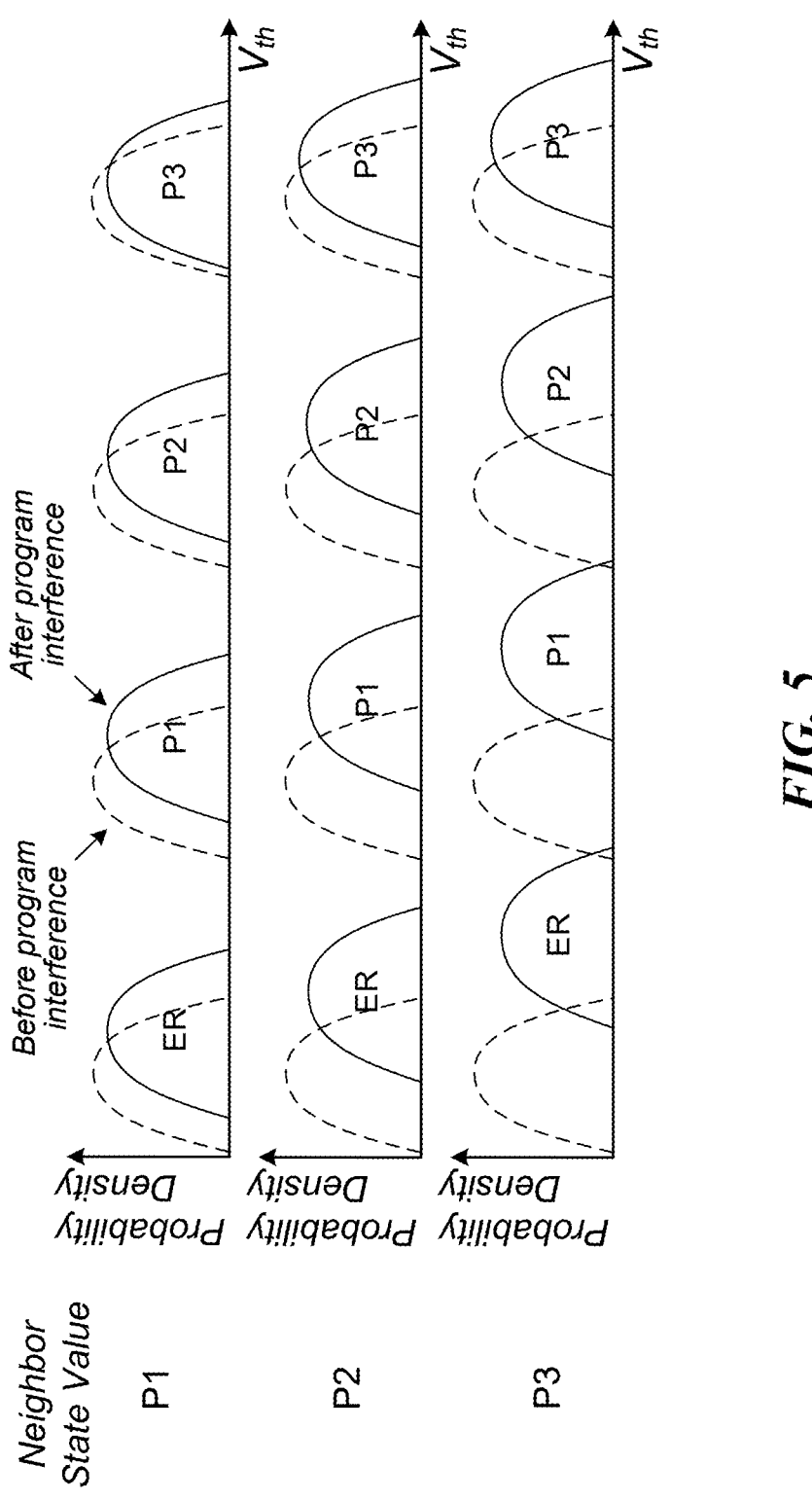
FIG. 5 is an example diagram illustrating the cell voltage level distribution $(V_{th})$ of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1.

Similarly, the shift in the threshold voltage distributions is greatest when the neighboring state is programmed to P3.

Figure 6:
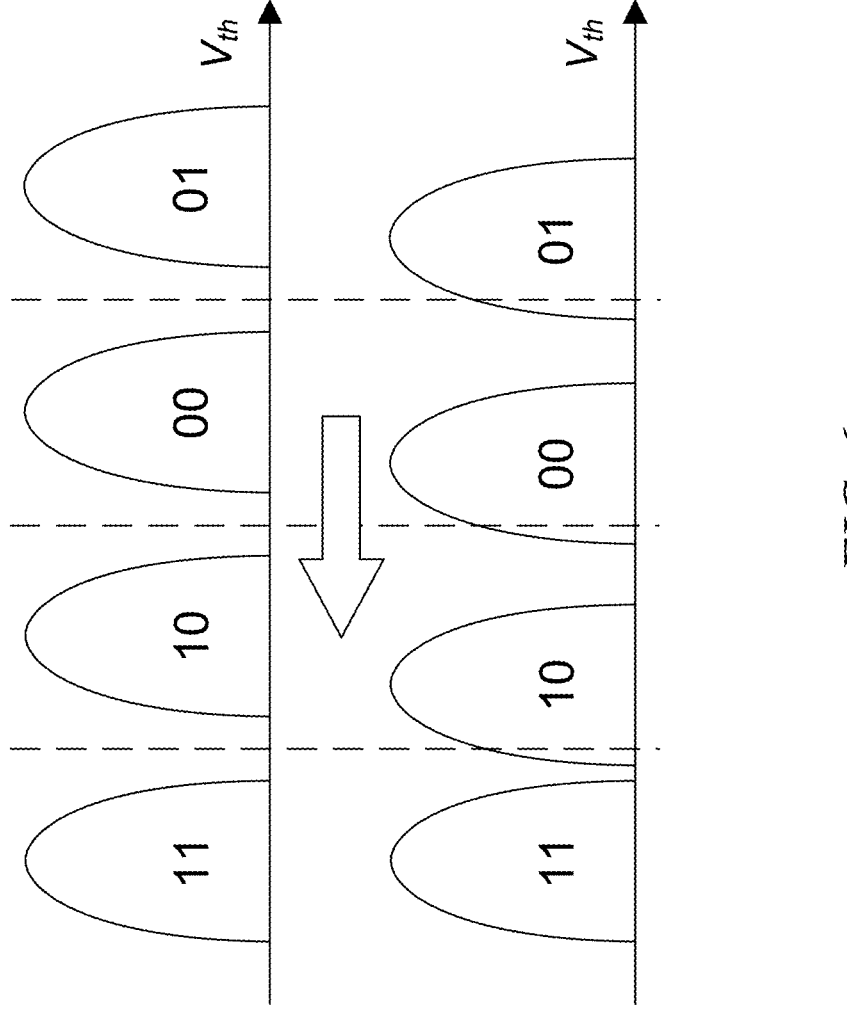
FIG. 6 is an example diagram illustrating the cell voltage level distribution $(V_{th})$ of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

In NAND-based storage systems (e.g., the examples illustrated in FIGS. 1-6) and solid-state drive (SSD) applications, the retrieved data usually contains many bit errors due to various noise sources. To enable data retrieval with fewer bit errors, the data may be encoded using an error-correction code (ECC) before being written to the NAND-based storage system. A decoder for the deployed ECC will typically be able to correct all bit errors caused by the noise. However, when the number of errors surpasses the capability of the ECC, the storage device may invoke defense algorithms to read the storage media multiple times with better (e.g., more accurately matching current physical conditions, or relying on newer data or samples) parameters than the original read operation until the data can be recovered by the ECC.

Figure 7:
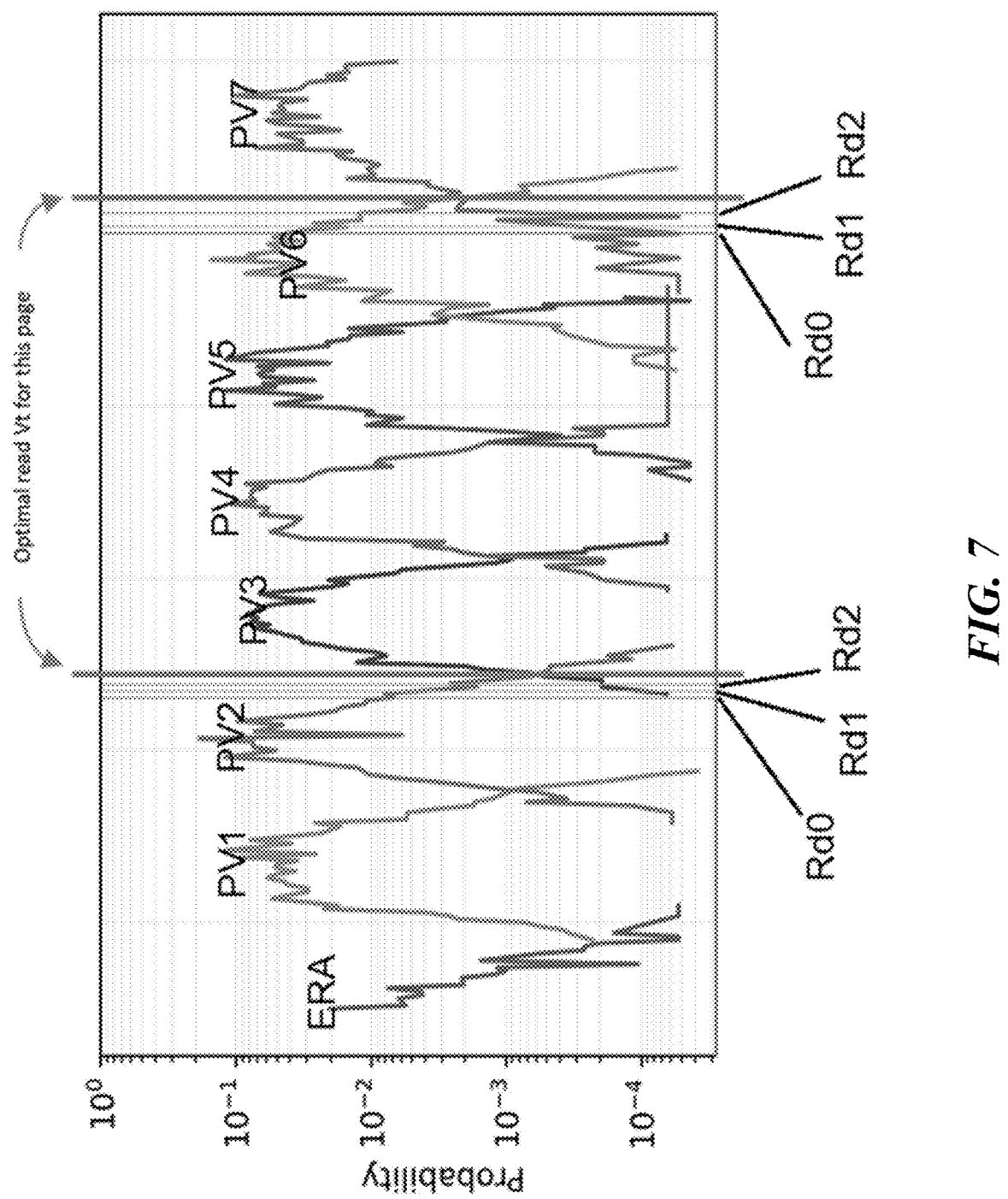
FIG. 7 illustrates an example of empirical voltage probability distributions and read thresholds for a triple level cell (TLC) NAND flash block.

One of the sources of bit errors is the use of sub-optimal read thresholds during the read operation, as shown in FIG. 7 that illustrates an example of empirical voltage probability distributions and read thresholds for a triple level cell (TLC) NAND flash block. Using sub-optimal read thresholds (Rd0, Rd1, Rd2) instead of the optimal read voltage (Vt) for the example erase distribution (ERA) and program verify (PV) distributions (e.g., PV1-PV7), illustrated in FIG. 7, can increase bit errors.

Existing solutions to this problem typically perform several additional read operations with different read thresholds on the same data page, and estimate the optimal read threshold that minimizes the bit errors in the retrieved data using the cell-counts from these additional read operations. However, the need for these additional read operations increases the latency of the read-command and degrades the quality-of-service (QoS) of the NAND-based storage systems and/or SSD application. Embodiments of the disclosed technology provide a weight-sharing neural network that uses previous read-attempts of the failed page to estimate the optimal read thresholds, thereby not incurring the additional latency associated with existing solutions.

Figure 8:
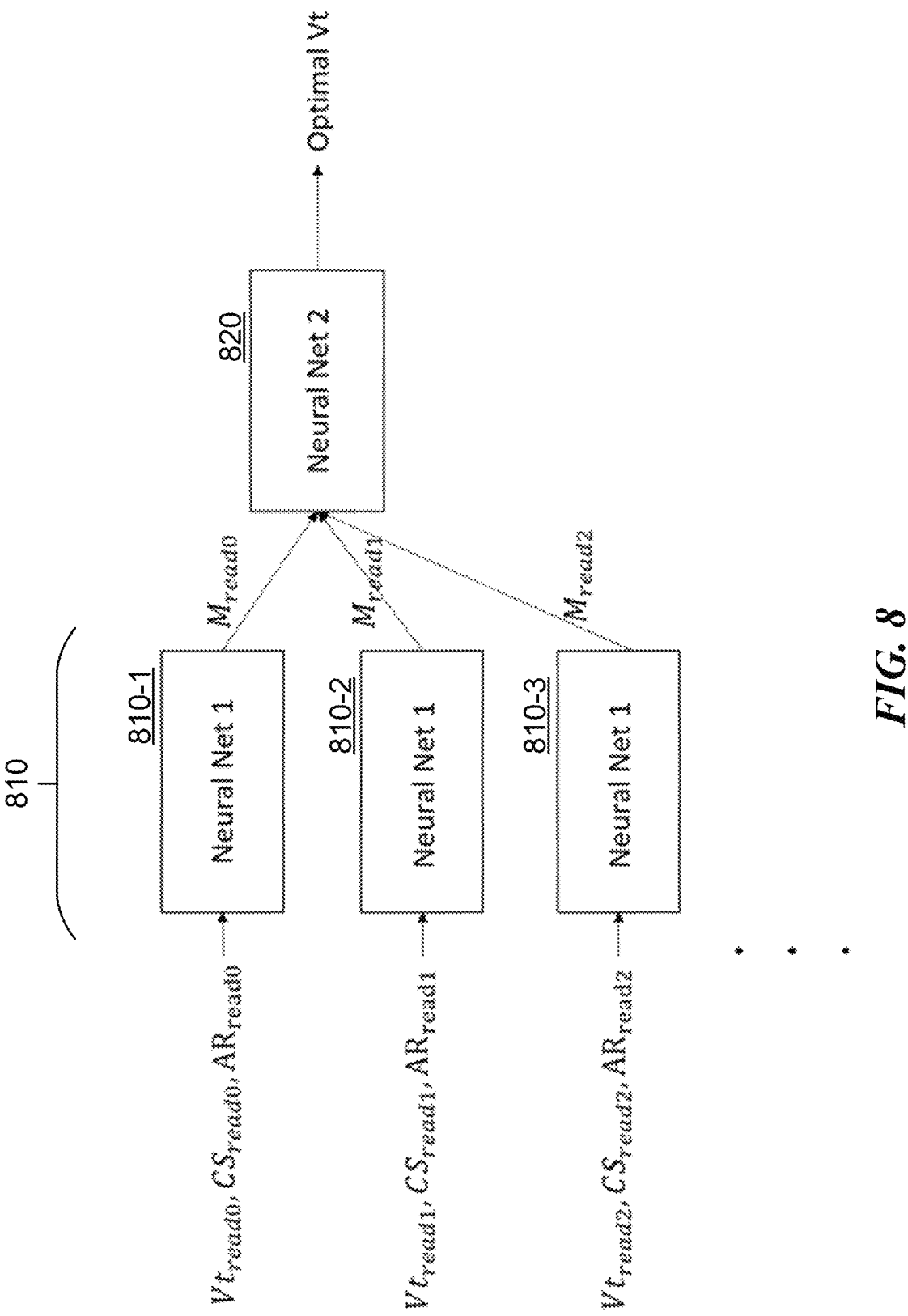
FIG. 8 is a block diagram illustrating an example architecture for the weight-sharing neural networks is configured to estimate read voltage thresholds.

FIG. 8 is a block diagram illustrating an example architecture for the weight-sharing neural networks that is configured to estimate optimal read voltage thresholds (e.g., "optimal read Vt" shown in FIG. 7) using previous read operations (also called history reads) that were performed on the same physical page. As shown therein, a first stage 810 includes multiple neural networks (810-1, 810-2, 810-3, . . . ) of a first type (denoted "Neural Net 1"), each of which is configured to receive parameters associated with a history read. Each Neural Net 1 is configured to process the data associated with a history read on the same page to generate an intermediate vector representation ($M_{readi}$). The neural network of the second type 820 (denoted "Neural Net 2") is configured to receive the intermediate vector representation from each Neural Net 1, and generate estimates of the read threshold Vt.

As shown in FIG. 8, an i-th Neural Net 1 receives parameters associated with each history read, including the read threshold set ($Vt_{readi}$), the checksum ($CS_{readi}$), and the asymmetric ratio ($AR_{readi}$). Alternatively, instead of (or in addition to) receiving the asymmetric ratio, the ones count ($OnesCt_{readi}$) and the zeros count ($ZeroCt_{readi}$) from that history read may be received by the i-th Neural Net 1. Thus, in an example, the inputs received by the weight-sharing neural network architecture includes read threshold sets ($Vt_{read0}$, $Vt_{read1}$, ... ), checksums ($CS_{read0}$, $CS_{read1}$, ... ), and asymmetric ratios ($AR_{read0}$, $AR_{read1}$, ... ).

In some embodiments, each of the read voltage threshold sets are the read voltage biases used in that particular read, and may include multiple values. For example, the $Vt_{read0}$ for reading a least significant bit (LSB) page from the NAND-based storage system comprises two read threshold values, $$Vt_{read0}^{L} \text{ and } Vt_{read0}^{R}.$$

In some embodiments, the checksum approximates the number of bit errors. In other embodiments, and when a low-density parity check (LDPC) code is used as an ECC, the syndrome weight corresponding to the number of unsatisfied check nodes of a codeword can be used as the checksum.

In some embodiments, the asymmetric ratio input to Neural Net 1 includes the ones count or the zeros count, corresponding to the number of "1"-valued bits and the number of "0"-valued bits in a codeword, respectively. Alternatively, the asymmetric ratio can be determined as the ones count divided by the zeros count, or the zeros count divided by the ones count.

As illustrated in FIG. 8, each Neural Net 1 (810-1, 810-2, 810-3, ... ) receives data gathered in each read of multiple reads on the same page, and processes this information to generate an intermediate vector representation $M_{readi}$. Each read is independently processed using a Neural Net 1, all of which share the same internal hyperparameters in this "weight-sharing" architecture. Neural Net 2 (820) receives the intermediate vector representation $M_{readi}$ from each Neural Net 1 (810-1, 810-2, 810-3, ... ), which corresponds to reads on the same page, and estimates the optimal read voltage thresholds $Vt_{opt}$. In this example architecture, the number of copies of Neural Net 1 is equal to the number reads used in the implementation.

More generally, additional reads from the same page will typically always improve performance of the weight-sharing neural network. However, processing these additional reads increases the latency associated with reading data from the page. In some examples, a lower number of reads results in some performance degradation, but the operation of the weight-sharing neural network is triggered earlier for the page (due to the fewer number of reads), and is able to reduce an average latency of the page read. In other examples, a higher number of reads results in improved performance, but operation of the weight-sharing neural network is triggered later for the page (due to the greater number of reads). However, despite the late triggering, the improved performance reduces a maximum latency of the page read.

In the example of a least significant bit (LSB) page in a TLC NAND, three reads are used to collect checksum and asymmetric ratio (e.g., ones count and zeros count) information. To predict the optimal read threshold for the LSB page in the TLC NAND, the three reads correspond to a read threshold set, which includes six read threshold voltages, and is represented as:

$$Vt_{read0} = \left[ Vt_{read0}^{L}, Vt_{read0}^{R} \right]$$

$$Vt_{read1} = \left[ Vt_{read1}^{L}, Vt_{read1}^{R} \right]$$

$$Vt_{read2} = \left[ Vt_{read2}^{L}, Vt_{read2}^{R} \right]$$

The checksums corresponding to the three reads are represented as:

$CS_{read0}$, $CS_{read1}$, $CS_{read2}$

The asymmetric ratio information corresponding to the three reads is represented as:

$AR_{read0}$, $AR_{read1}$, $AR_{read2}$

In some embodiments, the weights for Neural Net 1 are represented using multiple matrices $$A_{DNN,}^{Net1}, A_{DNN,}^{Net1}, \dots, A_{DNNN,}^{Net1}$$

and bias vectors $$b_{DNN,1}^{Net1}, b_{DNN,2}^{Net1}, \dots, b_{DNNM}^{Net1}.$$

For each, read ($M_{read0}$, $M_{read1}$ and $M_{read2}$) from the same page, the intermediate representation computed by Neural Net 1 is determined as:

$$M_{read0} = A_{DNN,M}^{Net1} \times R\big(A_{DNN,M-1}^{Net1} \times$$
$$R\big(A_{DNN,M-2}^{Net1} \times R\big( \dots R\big(A_{DNN,1}^{Net1} \times [Vt_{read0}, CS_{read0}, AR_{read0}] + b_{DNN,1}^{Net1}\big) \dots \big) +$$
$$b_{DNN,M-2}^{Net1}\big) + b_{DNN,M-1}^{Net1}\big) + b_{DNN,M}^{Net1}$$

$$M_{read1} =$$
$$A_{DNN,M}^{Net1} \times R\big(A_{DNN,M-1}^{Net1} \times R\big(A_{DNN,M-2}^{Net1} \times R\big( \dots R\big(A_{DNN,1}^{Net1} \times [Vt_{read1}, CS_{read1},$$
$$AR_{read1}] + b_{DNN,1}^{Net1}\big) \dots \big) + b_{DNN,M-2}^{Net1}\big) + b_{DNN,M-1}^{Net1}\big) + b_{DNN,M}^{Net1}$$

$$M_{read2} = A_{DNN,M}^{Net1} \times R\big(A_{DNN,M-1}^{Net1} \times$$
$$R\big(A_{DNN,M-2}^{Net1} \times R\big( \dots R\big(A_{DNN,1}^{Net1} \times [Vt_{read2}, CS_{read2}, AR_{read2}] + b_{DNN,1}^{Net1}\big) \dots \big) +$$
$$b_{DNN,M-2}^{Net1}\big) + b_{DNN,M-1}^{Net1}\big) + b_{DNN,M}^{Net1}$$

Herein, $R(\cdot)$ is an activation function. Activation functions that can be used include a rectified linear (ReLU) activation function, a logistic (or sigmoid) activation function, and/or a hyperbolic tangent (tanh) activation function.

Similarly, the weights for Neural Net 2 are represented using multiple matrices $$A_{DNN,1}^{Net2}, A_{DNN,2}^{Net2}, \dots, A_{DNN,N}^{Net1}$$

and biases vectors $$b_{DNN,1}^{Net2}, b_{DNN,2}^{Net2}, \dots, b_{DNN,N}^{Net2},$$

and the optimal read threshold voltage ($Vt_{opt}$) is determined as:

$$OptVt = A_{DNN,N}^{Net2} \times R(A_{DNN,N-1}^{Net2} \times$$

$$R(A_{DNN,N-2}^{Net2} \times R( \; ... \; R(A_{DNN,1}^{Net2} \times [M_{read0}, M_{read1}, M_{read2}] + b_{DNN,1}^{Net2}) \; ... \;) +$$

$$b_{DNN,N-2}^{Net2}) + b_{DNN,N-1}^{Net2}) + b_{DNN,N}^{Net2}$$

Although this example is described for an LSB page in a TLC NAND, the described embodiments can be adapted, for example, for most significant bit (MSB) and center significant bit (CSB) pages, and in other types of memory devices (e.g., QLC NAND).

In some embodiments, and in contrast to existing techniques for read threshold voltage estimation, the described embodiments are configured not to use read-channel modeling (e.g., the Gaussian model used in FIGS. 3-6) because these models do not accurately reflect the read channel considered herein, e.g., in an installed drive with realistic operating conditions. In some embodiments, the neural networks (e.g., 810 and 820 in FIG. 8) do not require any parameters from NAND flash channel models prior to prediction, and are trained offline on measurements collected from real NAND flash pages. In other embodiments, the offline training uses data generated using one or more numerical channel models.

In some embodiments, the neural networks (e.g., 810 and 820 in FIG. 8) are fully connected networks. In other embodiments, one or more of the fully connected layers is replaced by a layer that is not fully connected. In yet other embodiments, one or more of the fully connected layers is replaced by a convolutional layer.

The disclosed embodiments using the described weight-sharing architecture advantageously reduce the inference latency, e.g., compared to a system that uses a single neural network to receive the host read information and output the optimal read threshold set (denoted "SingleNN"). In a single neural network system, and for the example of the LSB page discussed above, all three host reads need to be completed before the read threshold sets ($Vt_{read0}$, $Vt_{read1}$, $Vt_{read2}$), checksums ($CS_{read0}$, $CS_{read1}$, $CS_{read2}$), and asymmetric ratios ($AR_{read0}$, $AR_{read1}$, $AR_{read2}$) are available to the neural network to estimate the optimal read threshold set. In contrast, an instance of Neural Net 1 can be activated as soon as a host read is completed and the parameters for that read are available.

During the normal operating mode of an SSD drive, multiple reads to different pages are placed in a queue for execution. For a particular page, this mode of operation results in reads to the particular page being non-consecutive and separated in time within the queue. As soon as a read to the particular page is completed, Neural Net 1 can be activated and its processing time overlaps with the reads to other pages that are different from the particular page. This results in the inference time of the overall system (e.g., as illustrated in FIG. 8) only being limited by the inference time of Neural Net 2. Thus, if the inference time of Neural Net 2 is appreciably less than the inference time of SingleNN, then the system can achieve superior performance to that of SingleNN, and with a shorter inference time.

FIG. 9 illustrates a flowchart of an example method 900 for improving the performance of a memory device. The method 900 includes, at operation 910, extracting one or more parameters from each of a plurality of history reads of a page of the memory device. In some embodiments, the memory device is accessed using a read threshold set, and the one or more parameters comprises a checksum, a ones count, a zeros count, or an asymmetric ratio that is based on a number of zero-to-one bit errors and a number of one-to-zero bit errors. In an example, the checksum is a syndrome weight that corresponds to a number of unsatisfied check nodes of a codeword of the LDPC code, the ones count is a number of ones in the codeword, and the zeros count is a number of zeros in the codeword.

The method 900 includes, at operation 920, processing, using each of a plurality of first neural networks, a corresponding history read of the plurality of history reads to generate a corresponding intermediate vector of a plurality of intermediate vectors. In some embodiments, each of the plurality of first neural networks are trained using measurements from one or more pages of another memory device, and each first neural network is activated upon determining that the one or more parameters for the corresponding history read have been extracted. In an example, each of the plurality of first neural networks is trained offline. Additionally, or alternatively, at least one of the first neural networks is trained online, e.g., the output of one or more first neural networks is incorporated into the training data of a first neural network.

The method 900 includes, at operation 930, processing, using a second neural network, the plurality of intermediate vectors to generate an updated read threshold set.

The method 900 includes, at operation 940, applying the updated read threshold set to the memory device to retrieve information from the memory device.

In some embodiments, the memory device is configured to use a low-density parity-check (LDPC) error correcting code (ECC).

In some embodiments, the method 900 further includes the operation of configuring each of the plurality of first neural networks without using parameters of a read-channel model of the memory device.

In some embodiments, each of the first plurality of first neural networks comprises a number of hidden layers, and an activation function for each hidden layer is a rectified linear unit (ReLU). Alternatively, other activation functions (e.g., a sigmoid or logistic activation function, a hyperbolic tangent activation function, a leaky ReLU activation function, a randomized ReLU activation function, and the like) can be used.

In some embodiments, at least one hidden layer is not fully connected.

In some embodiments, the memory device is a triple-layer (or triple-level) cell (TLC) NAND flash memory device. Alternatively, the memory device is a quad-level cell (QLC) or a multi-level cell (MLC) NAND flash memory device.

In some embodiments, the plurality of history reads correspond to a prior failed attempt to read data from the page of the memory device.

Figure 10:
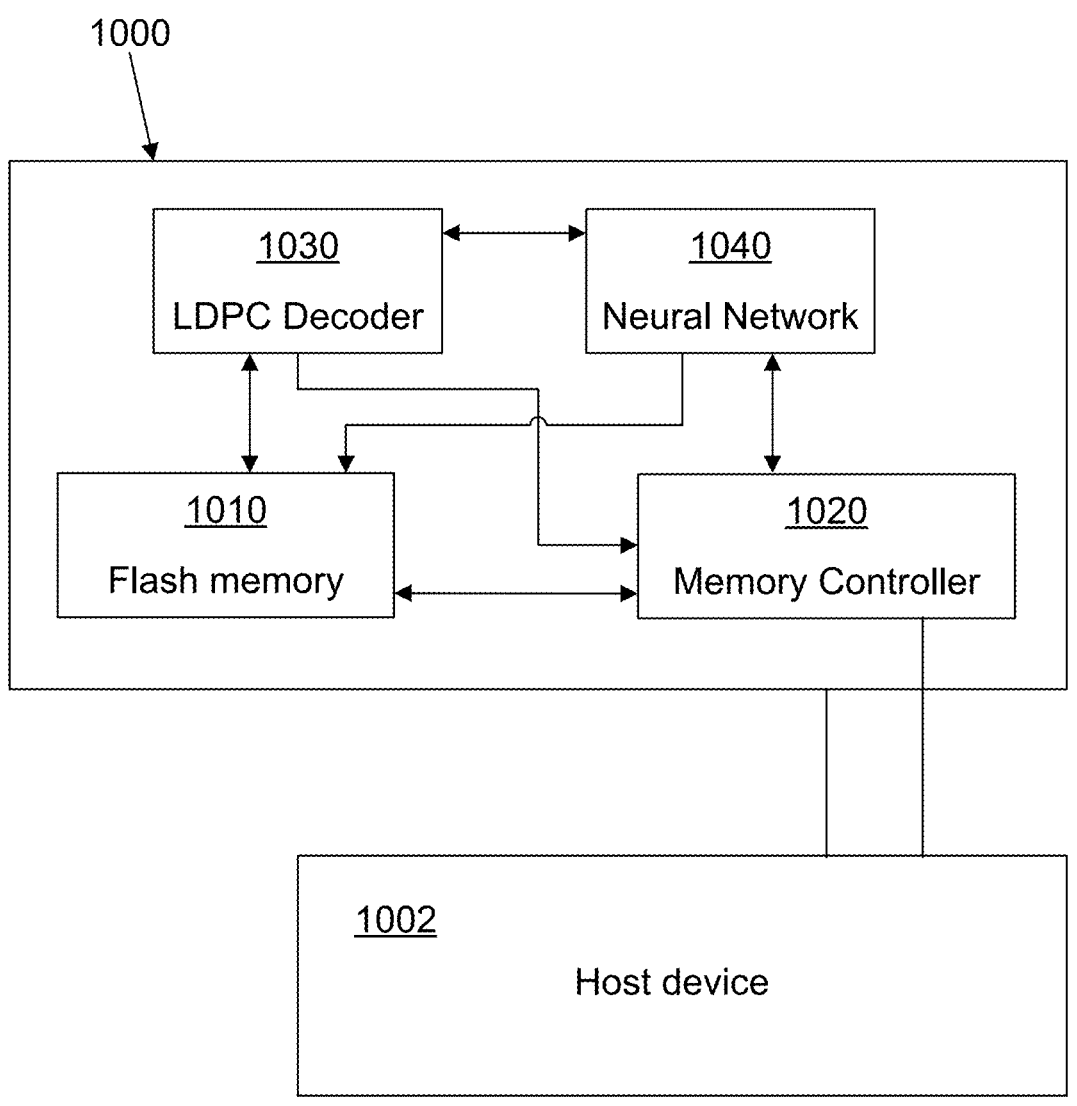
FIG. 10 is an example diagram illustrating a storage device that can be configured to implement the described embodiments.

FIG. 10 is an example diagram illustrating a storage device that can be configured to implement the described embodiments. Referring to FIG. 10, a data storage device 1000 may include a flash memory 1010, a memory controller 1020, an LDPC decoder 1030, and a neural network 1040. As shown therein, the data storage device 1000 is communicatively coupled to a host device (or a "host") 1002. The memory controller 1020 may control the flash memory 1010, the LDPC decoder 1030, and/or the neural network 1040 in response to control signals input from the outside of the data storage device 1000, e.g., from the host 1002. In an example, the host 1002 may require information from the flash memory 1010, and send a host read request (command) to the data storage device 1000, which then uses the memory controller 1020 to access the required data that is stored on the flash memory 1010. In the data storage device 1000, the flash memory 1010 may be configured the same or substantially the same as a nonvolatile memory device. That is, the flash memory 1010 may read data from selected memory cells using different read voltages to output it to the memory controller 1020.

In some embodiments, the neural network 1040 is implemented within the memory controller 1020, e.g., on one or more processors (not shown in FIG. 10) in the memory controller 1020. In an alternative architecture, the one or more processors in the data storage device 1000 are external to the memory controller 1020.

In some embodiments, the data storage device 1000 may be a memory card device, an SSD device, a multimedia card device, an SD card, a memory stick device, an HDD device, a hybrid drive device, or an USB flash device. For example, the data storage device 1000 may be a card which satisfies the standard for user devices such as a digital camera, a personal computer, and so on.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. Processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving a performance of a memory device, comprising:

extracting one or more parameters from each of a plurality of history reads of a page of the memory device, wherein the memory device is accessed using a read threshold set, and wherein the one or more parameters comprises a checksum, a ones count, a zeros count, or an asymmetric ratio that is based on a number of zero-to-one bit errors and a number of one-to-zero bit errors;

processing, using each of a plurality of first neural networks, a corresponding history read of the plurality of history reads to generate a corresponding intermediate vector of a plurality of intermediate vectors, each of the plurality of first neural networks having been trained using measurements from one or more pages of another memory device, and each first neural network being activated upon determining that the one or more parameters for the corresponding history read have been extracted;

processing, using a second neural network, the plurality of intermediate vectors to generate an updated read threshold set; and applying the updated read threshold set to the memory device to retrieve information from the memory device.

2. The method of claim 1, wherein the memory device is configured to use a low-density parity-check (LDPC) code, and wherein the checksum is a syndrome weight that corresponds to a number of unsatisfied check nodes of a codeword of the LDPC code, the ones count is a number of ones in the codeword, and the zeros count is a number of zeros in the codeword.

3. The method of claim 1, comprising:

configuring each of the plurality of first neural networks without using parameters of a read-channel model of the memory device.

4. The method of claim 1, wherein each of the first plurality of first neural networks comprises a number of hidden layers, and wherein an activation function for each hidden layer is a rectified linear unit (ReLU).

5. The method of claim 4, wherein at least one hidden layer is not fully connected.

6. The method of claim 1, wherein the memory device is a triple-layer cell (TLC) NAND flash memory device.

7. The method of claim 1, wherein the plurality of history reads correspond to a prior failed attempt to read data from the page of the memory device.

8. An apparatus for improving a performance of a memory device, comprising:

a memory controller;

a plurality of first neural networks, each first neural network being coupled to the memory controller; and a second neural network comprising a plurality of inputs, each input being coupled to an output of a corresponding first neural network, and an output being coupled to the memory controller, wherein the memory controller is configured to:

extract one or more parameters from each of a plurality of history reads of a page of the memory device, wherein the memory device is accessed using a read threshold set, and wherein the one or more parameters comprises a checksum, a ones count, a zeros count, or an asymmetric ratio that is based on a number of zero-to-one bit errors and a number of one-to-zero bit errors;

process, using each of the plurality of first neural networks, a corresponding history read of the plurality of history reads to generate a corresponding intermediate vector of a plurality of intermediate vectors, wherein each of the plurality of first neural networks is trained using measurements from one or more pages of another memory device, and each first neural network is activated upon determining that the one or more parameters for the corresponding history read have been extracted;

process, using the second neural network, the plurality of intermediate vectors to generate an updated read threshold set; and apply the updated read threshold set to the memory device to retrieve information from the memory device.

9. The apparatus of claim 8, wherein the memory device is configured to use a low-density parity-check (LDPC) code, and wherein the checksum is a syndrome weight that corresponds to a number of unsatisfied check nodes of a codeword of the LDPC code, the ones count is a number of ones in the codeword, and the zeros count is a number of zeros in the codeword.

10. The apparatus of claim 8, wherein the memory controller is configured to:

configure each of the plurality of first neural networks without using parameters of a read-channel model of the memory device.

11. The apparatus of claim 8, wherein each of the first plurality of first neural networks comprises a number of hidden layers, and wherein an activation function for each hidden layer is a rectified linear unit (ReLU) activation function, a sigmoid activation function, or a hyperbolic tangent (tanh) activation function.

12. The apparatus of claim 11, wherein at least one hidden layer is not fully connected.

13. The apparatus of claim 8, wherein the memory device is a triple-layer cell (TLC) NAND flash memory device.

14. The apparatus of claim 8, wherein the plurality of history reads correspond to a prior failed attempt to read data from the page of the memory device.

15. A non-transitory computer-readable storage medium having instructions stored thereupon for improving a performance of a memory device, comprising:

instructions for extracting one or more parameters from each of a plurality of history reads of a page of the memory device, wherein the memory device is accessed using a read threshold set, and wherein the one or more parameters comprises a checksum, a ones count, a zeros count, or an asymmetric ratio that is based on a number of zero-to-one bit errors and a number of one-to-zero bit errors;

instructions for processing, using each of a plurality of first neural networks, a corresponding history read of the plurality of history reads to generate a corresponding intermediate vector of a plurality of intermediate vectors, wherein each of the plurality of first neural networks is trained using measurements from one or more pages of another memory device, and each first neural network is activated upon determining that the one or more parameters for the corresponding history read have been extracted;

instructions for processing, using a second neural network, the plurality of intermediate vectors to generate an updated read threshold set; and instructions for applying the updated read threshold set to the memory device to retrieve information from the memory device.

16. The non-transitory computer-readable storage medium of claim 15, wherein the memory device is configured to use a low-density parity-check (LDPC) code, and wherein the checksum is a syndrome weight that corresponds to a number of unsatisfied check nodes of a codeword of the LDPC code, the ones count is a number of ones in the codeword, and the zeros count is a number of zeros in the codeword.

17. The non-transitory computer-readable storage medium of claim 15, wherein each of the first plurality of first neural networks comprises a number of hidden layers, and wherein an activation function for each hidden layer is a rectified linear unit (ReLU).

18. The non-transitory computer-readable storage medium of claim 17, wherein at least one hidden layer is not fully connected.

19. The non-transitory computer-readable storage medium of claim 15, wherein the memory device is a triple-layer cell (TLC) NAND flash memory device.

20. The non-transitory computer-readable storage medium of claim 15, wherein the plurality of history reads correspond to a prior failed attempt to read data from the page of the memory device.

\* \* \* \* \*